(12) United States Patent
Arsenault et al.

(10) Patent No.: US 9,130,227 B2
(45) Date of Patent: Sep. 8, 2015

(54) PHOTONIC CRYSTAL ELECTRICAL PROPERTY INDICATOR

(75) Inventors: Andre Arsenault, Toronto (CA); Geoffrey Alan Ozin, Toronto (CA)

(73) Assignee: OPALUX INCORPORATED, Toronto (CA)

( * ) Notice: Subject to any disclaimer, the term of this patent is extended or adjusted under 35 U.S.C. 154(b) by 1344 days.

(21) Appl. No.: 12/921,065

(22) PCT Filed: Mar. 4, 2009

(86) PCT No.: PCT/CA2009/000273
§ 371 (c)(1),
(2), (4) Date: Dec. 13, 2010

(87) PCT Pub. No.: WO2009/109048
PCT Pub. Date: Sep. 11, 2009

(65) Prior Publication Data
US 2011/0104535 A1 May 5, 2011

Related U.S. Application Data

(60) Provisional application No. 61/033,963, filed on Mar. 5, 2008.

(51) Int. Cl.
*H01M 6/50* (2006.01)
*H01M 10/48* (2006.01)
(Continued)

(52) U.S. Cl.
CPC ............ *H01M 6/5044* (2013.01); *H01M 6/505* (2013.01); *H01M 10/425* (2013.01); *H01M 10/488* (2013.01); *G01R 31/3686* (2013.01); *Y10T 29/49002* (2015.01)

(58) Field of Classification Search
CPC . H01M 6/5044; H01M 6/505; H01M 10/488; G01B 31/3686
USPC .......................................... 252/500, 582, 586
See application file for complete search history.

(56) References Cited

U.S. PATENT DOCUMENTS

| 4,163,186 A | 7/1979 | Haley |
| 4,563,254 A * | 1/1986 | Morduchowitz et al. ..... 205/436 |

(Continued)

FOREIGN PATENT DOCUMENTS

| EP | 1 130 672 A2 | 9/2001 | |
| WO | WO 99/05745 | * 2/1999 | ............ H01M 10/48 |

OTHER PUBLICATIONS

Accu Dyne Test solubility_table Web date taken as Wayback archive date Feb. 2, 2009 {http://www.accudynetest.com/solubility_table.html}.*

(Continued)

*Primary Examiner* — Patrick Ryan
*Assistant Examiner* — Aaron Greso
(74) *Attorney, Agent, or Firm* — Norton Rose Fulbright US LLP

(57) ABSTRACT

A photonic crystal electrical property indicator for a battery comprising: an electrically conductive working electrode and an electrically conductive counter electrode; an electrically-responsive photonic crystal material in contact with at least one of said first and second electrically conductive electrodes; an ionically conductive electrolyte provided between the working and counter electrodes; and electrical conductors for connecting the indicator to terminals of the battery; wherein the photonic crystal material has a reflectance spectrum that is responsive to a change in at least one electrical property of the battery, thereby providing an optically detectable indication of the at least one electrical property of the battery.

28 Claims, 6 Drawing Sheets

(51) Int. Cl.
*H01M 10/42* (2006.01)
*G01R 31/36* (2006.01)

(56) References Cited

U.S. PATENT DOCUMENTS

| | | | |
|---|---|---|---|
| 4,723,656 A | | 2/1988 | Kiernan et al. |
| 5,225,104 A | * | 7/1993 | Van Steenkiste et al. .................. 252/299.01 |
| 5,250,905 A | | 10/1993 | Kuo et al. |
| 5,339,024 A | | 8/1994 | Kuo et al. |
| 5,396,177 A | | 3/1995 | Kuo et al. |
| 5,607,790 A | | 3/1997 | Hughen et al. |
| 5,612,151 A | | 3/1997 | Hughen |
| 5,614,333 A | | 3/1997 | Hughen et al. |
| 5,667,538 A | | 9/1997 | Bailey |
| 5,849,046 A | | 12/1998 | Bailey |
| 6,483,275 B1 | | 11/2002 | Nebrigic et al. |
| 7,247,349 B2 | | 7/2007 | Ozin et al. |
| 7,362,673 B2 | | 4/2008 | Arsenault et al. |
| 2004/0131799 A1 | * | 7/2004 | Arsenault et al. ............ 428/1.26 |
| 2006/0097699 A1 | | 5/2006 | Kamenoff |
| 2009/0034051 A1 | | 2/2009 | Arsenault et al. |

OTHER PUBLICATIONS

Arsenault, et al., "*Photonic-Crystal Full-Colour Displays*", *Nature Photonics*, vol. 1, Aug. 2007, pp. 468-472.

Arsenault, et al., "*A Polychromic, Fast Response Metallopolymer Gel Photonic Crystal with Solvent and Redox Tunability*: A step towards photonic ink (P-Ink)", *Advanced Materials*, vol. 15. No. 6 (2003), pp. 503-507.

Lopez, C., "*Materials Aspects of Photonic Crystals*", *Advanced Materials*, vol. 15, No. 20, (2003), pp. 1679-1704.

Intellectual Property Office of Canada, English Translation of Written Opinion of the International Searching Authority in International Patent Application No. PCT/CA2009/000273 (Jun. 1, 2009).

Intellectual Property Office of Canada, English Translation of the International Search Report in International Patent Application No. PCT/CA2009/000273.

Office Communication in European Patent Application No. 09717899.0 mailed Mar. 7, 2014.

Puzzo et al., "Electroactive Inverse Opal: A Single Material for All Colors," *Agnew Chem.* 121: 961-965, 2009.

* cited by examiner

PHOTONIC CRYSTAL ELECTRICAL PROPERTY INDICATOR

CROSS-REFERENCE TO RELATED APPLICATIONS

This application claims priority to PCT/CA2009/000273 filed Mar. 4, 2009, which claims priority of U.S. Provisional Application No. 61/033,963, filed Mar. 5, 2008, both of which are herein incorporated by reference in their entireties, for all that they teach without exclusion.

TECHNICAL FIELD

This disclosure relates to electrical property indicators. In particular, this disclosure relates to electrical property indicators incorporating a photonic crystal, and which indicator is suitable for indicating the state-of-charge of batteries.

BACKGROUND

Battery state-of-charge indicators are employed to give the user a measure of remaining charge in a battery. Such indicators can operate in different ways, by measuring different parameters which change over the life of the battery. For example, as a battery is discharged its voltage output will decrease, so that a device that monitors voltage can be used to gauge the remaining charge once this effect has been calibrated. As the battery is discharged the maximum current that can be discharged will also decrease, allowing a measure of discharged current to be used to estimate remaining battery life. In addition, by accurately measuring the amount of current which has been provided by the battery, and relating this to a known amount of total charge in the battery, an exact measure of remaining charge can be obtained.

External testers based on careful monitoring of voltage, current, and remaining charge using electronic means are typically accurate and reproducible. There are different examples of such devices, two examples of which can be found in U.S. Pat. No. 4,163,186 and U.S. Patent Application Publication No. 2006/0097699. While such testers can be quite accurate, they are seldom used by the public due to the necessity of buying and using a separate device, and the inconvenience of needing it on-hand whenever the remaining life of a battery needs to be estimated.

On-battery testers, while typically less accurate, are typically far more convenient since they are already integrated onto the surface of a battery when purchased by a consumer. In an embodiment of such device, the user is prompted to press one or two spots on the battery surface, resulting in the appearance of a "fuel gauge" type bar, whose height indicates remaining charge (for example, as disclosed in U.S. Pat. Nos. 4,723,656, 5,250,905, 5,339,024, 5,396,177, 5,607,790, 5,612,151, 5,614,333). Devices as marketed by Duracell, for example, rely on a thermochromic layer on top of a resistive conductor: When the spots are pressed by the user, current will flow through the resistive conductor, causing an increase in heat and a color change in the thermochromic ink. As the charge in the battery is depleted, the available current will decrease, causing a decrease in the amount of "activated" thermochromic ink. While convenient, these testers may not be very accurate due to the dependence of applied pressure on gauge reading, and each time the tester is used the battery is effectively being short-circuited which may decrease the life of the battery.

Other possible on-battery tester types include electrochromic coatings (for example, as disclosed in U.S. Pat. Nos. 5,849,046 and 5,667,538), but these have not so far been implemented in commercial devices.

Photonic crystals are materials having a periodic modulation in their refractive index. This modulation causes coherent diffraction effects which manifest themselves, for example, as reflections of particular bands of wavelengths from the photonic crystal, given the photonic crystal certain optical characteristics, such as a reflectance spectrum. The optical characteristics, such as the wavelengths of the reflectance spectrum, are directly related to the length scale of the periodic modulation. Therefore, by changing the periodicity of the photonic crystal structure, the optical characteristics of the photonic crystal are also changed.

Photonic crystal materials may be designed to be responsive to external stimuli, in particular electrical stimuli. An example of such a material is described in U.S. Pat. No. 7,364,673 and in U.S. patent application Ser. No. 11/831,679 the entirety of which is hereby incorporated by reference.

It may be desirable to provide an electrical property indicator suitable for on-battery use.

SUMMARY

An electrical property indicator is disclosed. The indicator comprises a photonic crystal material, and may be suitable for on-battery use. The indicator may provide visually detectable indication of the state-of-charge of a battery.

In some aspects, there is provided a photonic crystal electrical property indicator for a battery comprising: an electrically conductive working electrode and an electrically conductive counter electrode, the working and counter electrodes being spaced apart; an electrically-responsive photonic crystal material in contact with at least one of said first and second electrically conductive electrodes; an ionically conductive electrolyte provided between the working and counter electrodes, the electrolyte being in electrical communication with both the working and counter electrodes and the photonic crystal material; and electrical conductors in electrical communication with the working and counter electrodes for connecting the indicator to terminals of the battery; wherein the photonic crystal material has a reflectance spectrum that is responsive to a change in at least one electrical property of the battery, thereby providing an optically detectable indication of the at least one electrical property of the battery.

In some examples, the optically detectable indication may be visibly detectable.

In some examples, the at least one electrical property of the battery may be a charge remaining in the battery.

In some examples, the photonic crystal material may include an ordered array of first constituents having a first refractive index embedded within a polymer matrix having a second refractive index different than the first refractive index, the ordered array of first constituents having a lattice spacing giving rise to the reflectance spectrum; wherein the polymer matrix may be expandable and contractible in response to uptake and expulsion of at least one component of the ionically conductive electrolyte, expansion and contraction of the polymer matrix giving rise to changes in the lattice spacing; wherein the uptake and expulsion of the at least one component of the ionically conductive electrolyte being responsive to a change in the at least one electrical property of the battery; and wherein the reflectance spectrum is dependent on the lattice spacing. The polymer may be chosen from one or more of: polyferrocenylsilanes, polythiophenes, polypyrroles, polyanilines, polyphenylene vinylenes, polyacetylenes, polyfluorenes, conducting polymers, conjugated polymers, metallopolymers, copolymers incorporating such polymer types, and combinations thereof. The polymer matrix may include linear polymer chains and/or a cross-linked polymer network. The cross-linked polymer network may have cross-linking groups selected from one or more of: covalent bonds, ionic bonds, polar covalent bonds, hydrogen bonds, hydrophobic interactions, coordination bonds, and combinations thereof. The polymer matrix may be incorporated using a method selected from one or more of: melt infiltration, polymerization of a monomer or combination of monomers, polymerization of a crosslinker, solution infiltration, gas-phase infiltration, electrophoresis, sublimation, or combinations thereof. The ordered array of first constituents may include an ordered array of substantially spherical constituents. The substantially spherical constituents may include substantially spherical voids. The substantially spherical voids may be filled with at least one component of the ionically conductive electrolyte.

In some examples, the reflectance spectrum may be in the range of: visible spectrum, ultraviolet spectrum, infrared spectrum, or combinations thereof.

In some examples, the photonic crystal material may have a substantially uniform electrical response over its entire surface or it may have substantially different electrical responses in at least two portions of its surface.

In some examples, the indicator may be flexible.

In some examples, the indicator may be useable in a label of the battery.

In some examples, at least a portion of the indicator may be substantially transparent.

In some examples, the indicator may include a visual effect that may be optically detectable in combination with the reflectance spectrum of the photonic crystal material. The visual effect may be one or more of: a design, a tint, a hue, shading, homogenous colors, patterns, alpha-numeric characters, graphical representations, pictures, images, data, and combinations thereof. The visual effect may be static or dynamic. A change in the reflectance spectrum of the photonic crystal material may cause the visual effect to become more or less visible. The visual effect may be dynamic in response to at least one of a change in the reflectance spectrum of the photonic crystal material and an external stimulus.

In some examples, at least one of the working and counter electrodes may be made from a conductive material selected from one or more of: conductive oxides, conductive ceramics, metals, carbons, conducting polymers, redox-active polymers, nanoparticles, and combinations thereof.

In some examples, at least one of the working and counter electrodes may be provided on a substrate. The substrate may be one or more of: fabrics, papers, metals, polymers, glasses, ceramics, semiconductors, inorganic materials, and combinations thereof.

In some examples, a charge-storage material may be provided on at least one of the working and counter electrodes, or may be provided within the ionically conductive electrolyte. The charge-storage material may be made from a material selected from one or more of: conductive oxides, conductive ceramics, metals, carbons, conducting polymers, redox-active polymers, nanoparticles, redox-active small molecules, and combinations thereof. The charge-storage material may be porous. The change-storage material may have different thicknesses in at least two portions of the indicator.

In some examples, the indicator may provide a substantially homogenous or inhomogeneous indication of the at least one electrical property.

In some aspects, there is provided the combination, of the indicator described above together with a reference chart for evaluating the at least one electrical property of the battery.

In some aspects, there is provided a method of manufacturing a photonic crystal electrical property indicator comprising: providing an electrically conductive working electrode; providing an electrically-responsive photonic crystal material in electrical communication with the working electrode; providing an electrically conductive counter electrode spaced apart from the working electrode; providing an ionically conductive electrolyte between the working and counter electrodes, the electrolyte being in electrical communication with the working and counter electrodes and the photonic crystal material; sealing the electrolyte between the working and counter electrodes; and providing electrical conductors in electrical communication with the working and counter electrodes for connecting the indicator to terminals of a battery.

In some aspects, there is provided a battery label and a batter tester comprising the indicator described above.

BRIEF DESCRIPTION OF DRAWINGS

The present disclosure will be discussed with reference to the drawings, in which.

DETAILED DESCRIPTION

This disclosure describes a photonic crystal electrical property indicator incorporating a photonic crystal material. The photonic crystal electrical property indicator may be suitable for on-battery use, and may be useful for visually estimating the remaining state-of-charge of a battery.

Figure 1:
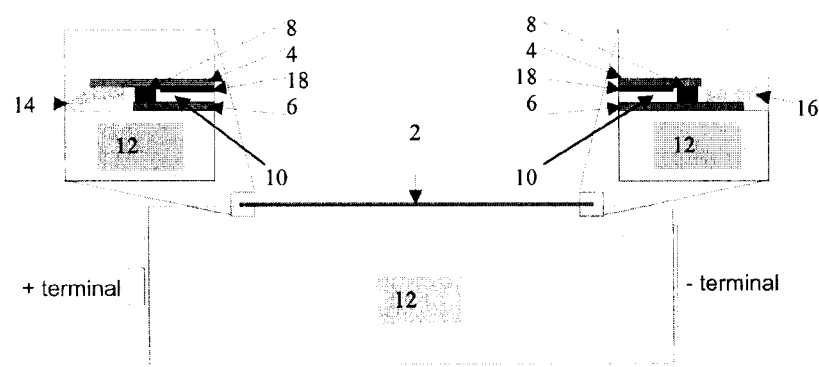
FIG. 1 is a schematic diagram of an embodiment of a photonic crystal electrical property indicator, in accordance with an aspect of the disclosure, affixed to a battery casing.

Reference is first made to FIG. 1, showing a schematic diagram of an embodiment of the photonic crystal electrical property indicator. In this example, the indicator is a voltage-indicating indicator, and is shown affixed externally to a battery casing.

As shown, the indicator 2 may be in the form of a 2-electrode electrochemical cell, with an electrically conductive working (or primary) electrode 4 and an electrically conductive counter (or secondary) electrode 6. The working electrode 4 and the counter electrode 6 are spaced apart, for example using a spacer 8, which creates a gap delimiting the cell space. Ionically conducting electrolyte 10 is provided in the gap between the working and counter electrodes 4, 6. The electrolyte 10 is in electrical communication with the working and counter electrodes 4, 6. The indicator 2 includes electrical conductors in electrical communication with the working and counter electrodes 4, 6 for connecting the indicator 2 to a battery 12. For example, the indicator 2 may be connected to the termini of the battery via electrical conductors such as conductive bridges 14, 16 connecting the working electrode 4 and counter electrode 6, respectively. Other suitable electrical conductors may include wires, conductive adhesives, solder connections, and/or welding connections. An electrically-responsive photonic crystal material 18 is provided on the working electrode 4, and is also in electrical communication with the electrolyte 10. The photonic crystal material 18 is responsive to the electrical state (e.g., voltage or discharge current) of the battery 12 and provides a detectable indication of that electrical state.

The working and counter electrodes 4, 6 may be made of the same material and have substantially the same design. Alternatively, the working and counter electrodes 4, 6 may be made of different materials and/or have different configurations. The material and/or configuration of the working and counter electrodes 4, 6 may affect the electrical response of the photonic crystal material 18 as described below.

In general, materials and configurations suitable for the working electrode 4 may also be suitable for the counter electrode 6. As such, construction of the two electrodes 4, 6 will be discussed together. Suitable materials for the electrodes 4, 6 may include various electrically conductive materials including but not limited to conductive oxides, conductive ceramics, metals, carbons, conducting polymers, redox-active polymers, nanoparticles, and combinations thereof. Other suitable electrically conductive materials may be used. These electrically conductive materials may be freestanding, or may be supported on an electrode substrate. Such an electrode substrate may be made from materials including but not limited to fabrics, papers, metals, polymers, glasses, ceramics, inorganic materials, and combinations thereof. The electrodes 4, 6 and the electrode substrate may be chosen to be flexible.

The electrodes 4, 6 may be coated with a charge-storage material. A charge-storage material may also be present within the ionically conductive electrolyte. Depending on its capacity to hold charge, as well as on its own electrical and electrochemical properties, the charge-storage material may influence the nature and magnitude of the changes in the optical characteristics of the photonic crystal material 18. For example, providing a charge-storage material with relatively large charge capacity on the counter electrode 6 may cause the indicator 2 to be less sensitive to discharge of the battery 12 than a charge-storage material with relatively small charge capacity. Conversely, providing a charge-storage material with a relatively large charge capacity on the working electrode 4 may cause the indicator 2 to be more sensitive to discharge of the battery 12 than a charge-storage material with relatively small charge capacity. The charge-storage material may modulate the response of the photonic crystal material 18 by affecting electrical properties such as the electric field, voltage level and/or capacitance between the electrodes 4, 6.

Such charge-storage materials may consist of various materials including but not limited to conductive oxides, conductive ceramics, metals, carbons, conducting polymers, redox-active polymers, nanoparticles, redox-active small molecules, and combinations thereof. The charge-storage material may be fully dense, or may be porous; it may be relatively smooth or rough. The charge-storage material may range from very good to relatively poor conductivity. The charge-storage material may undergo a chemical change (e.g., redox reaction, intercalation, etc.) in order to store a charge, or it may be storing charge at its surface, in which case a greater surface area (e.g., in the case of a porous material) may provide greater charge capacity. The charge-storage material may be deposited on one or both of the electrodes 4, 6 by known methods, such as using liquid deposition (e.g., dip coating, curtain coating, slot die, screen printing, gravure coating, meyer bar coating, spray coating, etc.), from gas-phase deposition (e.g., thermal evaporation, sputtering, spray pyrolysis, chemical vapor deposition, nanoparticle aerosol, etc.), or solid-phase deposition (e.g., extrusion, drawing, melt forming, etc.). These methods may be adapted to printing or coating of patterns with predefined thicknesses. The charge-storage material may also be made separately and then attached to the electrode.

The charge-storage material may also be provided in the electrolyte 10. For example, the electrolyte 10 may contain a dissolved species, such as silver ions. Such a species may be reduced when the indicator 2 is connected to a charge, effectively storing the charge. This may be reversed as the charge changes. The electrolyte 10 may contain other electroactive components that may undergo a chemical or electrochemical reaction at the working or counter electrodes 4, 6.

Although the counter electrode 6 is shown closest to the external surface of the battery 12 and the working electrode 4 is shown spaced farther from the external surface of the battery 12, the positions of the two electrodes 4, 6 may be reversed. If the photonic crystal material 18 is provided on the electrode closest to the external surface of the battery 12, it may be necessary for the farther-spaced electrode to be transparent or semi-transparent in order for the optical characteristics of the photonic crystal material 18 to be detectable. Similarly, although the working electrode 4 is shown connected to the positive terminal of the battery 12 and the counter electrode 6 is shown connected to the negative terminal of the battery 12, the connections may be reversed. In general, the photonic crystal material 18 may be provided on the working electrode 4. In some embodiments, the photonic crystal material may be provided in contact with both the working and the counter electrodes 4, 6. This may be suitable, for example, where the photonic crystal material 18 is sufficiently non-conductive such that, in response to a battery voltage, it would be oxidized on a side in contact with the working electrode 4 while reduced on a side in contact with the counter electrode 6, without shorting itself out.

The photonic crystal material 18 may have certain optical characteristics, such as reflection or transmission of certain wavelength bands. Typically, the electrically-responsive photonic crystal material 18 has an initial reflectance spectrum that changes in response to electrical stimuli. As the battery 12 changes in an electrical property such as state-of-charge (e.g., through discharging or recharging), the battery 12 also changes in electrical properties such as voltage, current, and charge capacity. In response to a change in one or more of the battery's electrical properties, the optical characteristics of the photonic crystal material 18 may also change. This change in optical characteristics may be detectable, for example using wavelength-sensing equipment. The change in optical characteristics may comprise a shifting of the reflectance spectrum towards longer or shorter wavelengths. This change may also be visually detectable, so as to provide a user with a visual measure of the charge remaining in the battery 12. For example, the reflectance spectrum may initially occur at and/or be shifted to visible wavelengths. Such changes in optical characteristics may be due to changes in the periodic modulation and/or change in refractive index of one or more components of the photonic crystal material 18. A photonic crystal material suitable for this application, and its response mechanism, is described in U.S. patent application Ser. No. 11/831,679, the entirety of which is hereby incorporated by reference.

In general, the photonic crystal material 18 may comprise an ordered array of a first material having a certain refractive index, embedded in a second matrix material having a different refractive index. The photonic crystal material 18 would present a periodically alternating refractive index and a particular lattice spacing, which would give rise to particular optical characteristics, such as a particular reflectance spectrum. The matrix material may consist of a polymer matrix, this polymer matrix being expandable and contractible in response to a controlled uptake and expulsion, respectively, of at least one component of the ionically conductive electrolyte 10 filling the cell space. The expansion and contraction of the polymer matrix would in turn cause an expansion and contraction of the lattice spacing, which would change the optical characteristics. This may be a change in the reflectance spectrum, which would occur, for instance, during the discharge cycle of a battery where the voltage, maximum current, and charge capacity are decreasing, or during the charging cycle of a battery where the voltage, maximum current, and charge capacity are increasing. The wavelengths of the reflectance spectrum may occur in a number of frequencies and may span more than one frequency range, including the ultraviolet, visible, and infrared spectra. In response to an electrical stimulus, the reflectance spectrum of the photonic crystal material 18 may shift frequencies, and may shift within a certain frequency range or between different frequency ranges (e.g., from visible to ultraviolet or vice versa). In some examples, where the indicator is designed to provide visually detectable indication of at least one electrical property, such as a state-of-charge of the battery, the photonic crystal material 18 may be designed have a reflectance spectrum that remains within the visible spectrum through the range of a battery's discharge levels. The reflectance spectrum of the photonic crystal material 18 may shift towards shorter or longer wavelengths as the battery discharges. Whether the shift is towards shorter or towards longer wavelengths may be dependent on whether the polymer matrix expands or contracts as the battery discharges, which may in turn be dependent on the polymer matrix, the electrolyte material and/or the device configuration (i.e., which electrode is connected to which terminal of the battery). A person skilled in the art would understand how to design the photonic crystal material 18 in order to elicit a desired response in the reflectance spectrum as the battery discharges.

Figure 2:
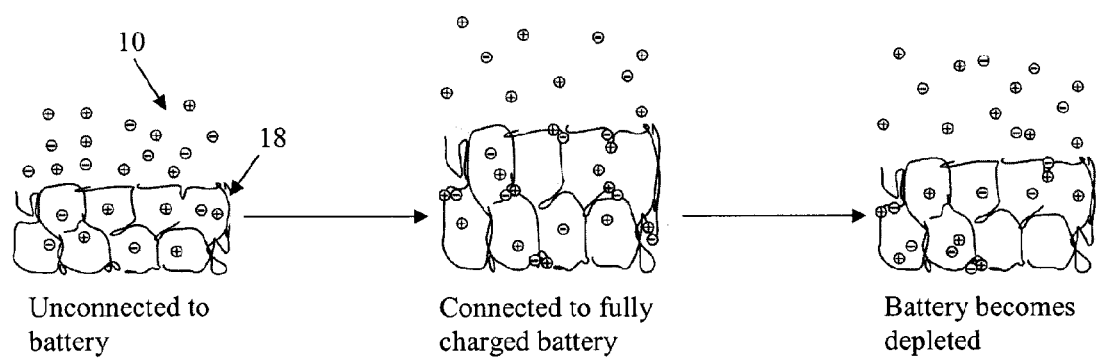
FIG. 2 illustrates the response of a photonic crystal material in an embodiment of a photonic crystal electrical property indicator to different charge states.

Reference is now made to FIG. 2, illustrating the response of the photonic crystal material 18 in an embodiment of the indicator 2 to the discharge state of a battery. This illustration depicts only a theory of the electrical response, and is not intended to be definitive nor limiting. The present disclosure is not held to this theory and is not dependent on this theory. As shown, when the indicator 2 is unconnected to a battery or any voltage or current source, the photonic crystal material 18 contains relatively few ions, but is surrounded by ions in the electrolyte 10. When the indicator 2 is connected to a fully charged battery, the charge of the battery causes electrons to move out from the photonic crystal material 18, resulting in a positive charge in the photonic crystal material 18 that drives uptake of negative ions from the electrolyte 10 into the photonic crystal 18. This causes swelling of the photonic crystal material 18, resulting in a change in the lattice spacing and hence a change in the reflectance spectrum of the photonic crystal material 18, as described above. As the battery is depleted, the reduction in battery voltage causes electrons to be re-added to the photonic crystal material 18, causing an expulsion of the negative ions from the photonic crystal material 18 back into the electrolyte 10. This causes contraction of the photonic crystal material 18, resulting in an opposite change in the lattice spacing and hence an opposite change in the reflectance spectrum of the photonic crystal material 18, as described above. Although this behavior is described in response to a battery charge, the response is not limited to being responsive to a voltage, and may include being responsive to a current or other electrical properties of a battery.

Figure 3:
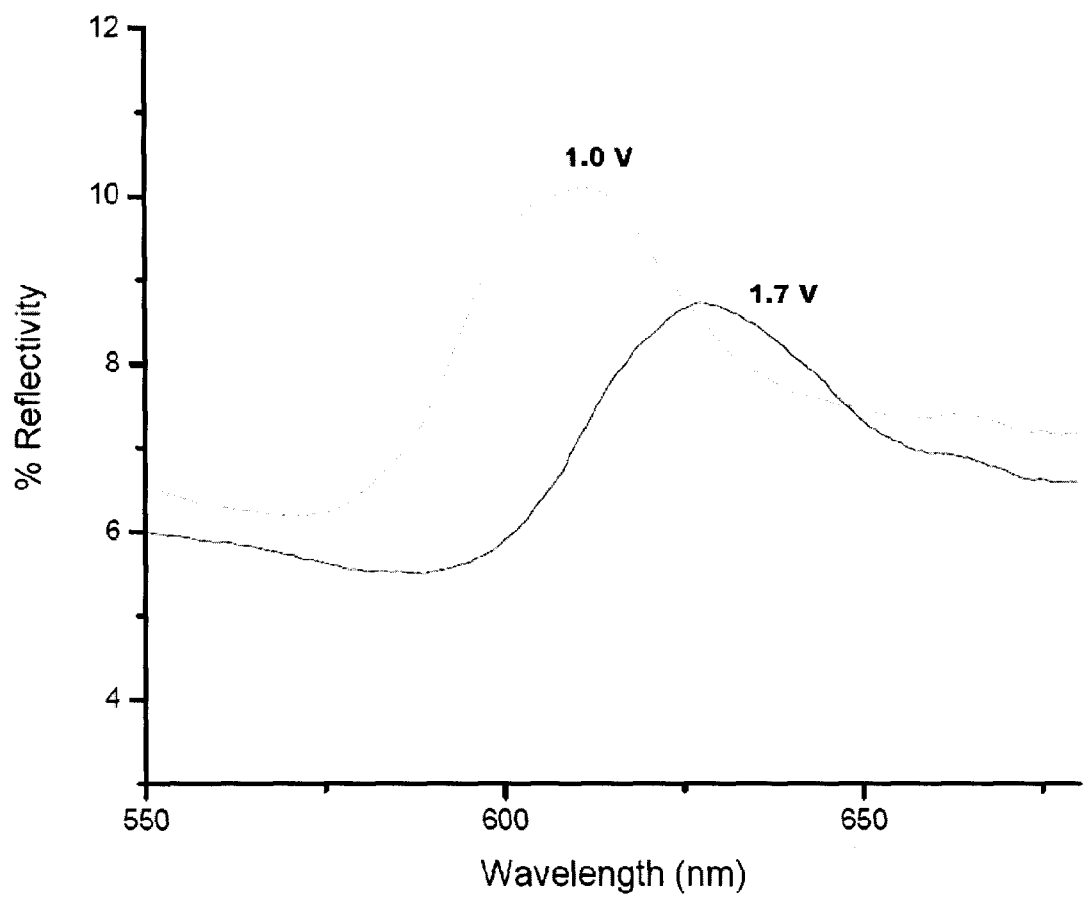
FIG. 3 is a graph showing the reflectance spectrum of a photonic crystal material in an embodiment of a photonic crystal electrical property indicator in response to different charge states.

Reference is now made to FIG. 3, which is a graph showing the reflectance spectrum of the photonic crystal material 18 in an embodiment of the indicator 2 at different battery charge states. As shown, when the indicator 2 is connected to a battery having 1.7 V (corresponding to a typical fully charged 1.5 V alkaline battery), the reflectance spectrum has a peak at around 625 nm. When the indicator 2 is connected to a battery having 1.0 V (corresponding to a depleted 1.5 V alkaline battery), the reflectance spectrum changes to a peak at around 600 nm. Thus, the indicator 2 provides an optically detectable indication of the state-of-charge of a battery.

In some embodiments, the photonic crystal material 18 may be comprised of a polymer matrix, wherein this polymer matrix may be selected from the group including but not limited to polyferrocenylsilanes, polythiophenes, polypyrroles, polyanilines, polyphenylene vinylenes, polyacetylenes, polyfluorenes, conducting polymers, conjugated polymers, metallopolymers, copolymers incorporating such polymer types, and combinations thereof. The polymer matrix may comprise linear polymer chains, or may contain a given density of cross-linking groups in order to provide a cross-linked polymer network. The cross-linking groups within the cross-linked polymer network may be selected from the group including but not limited to covalent bonds, ionic bonds, polar covalent bonds, hydrogen bonds, hydrophobic interactions, coordination bonds, or combinations thereof. The polymer matrix may be incorporated into the photonic crystal material 18 by a variety of methods including but not limited to melt infiltration, polymerization of a monomer or combination of monomers, polymerization of a crosslinker, solution infiltration, gas-phase infiltration, electrophoresis, sublimation, or combinations thereof. In some embodiments, the polymer material may be a polyferrocenylsilane bearing pendant vinyl groups, which is crosslinked using a multi-functional thiol in the presence of an activated radical initiator.

In some embodiments, the photonic crystal material 18 may be based upon an ordered array of substantially spherical components, and such an array may be created by the self-assembly of substantially monodispersed spherical colloids. Such spherical colloids may be made of materials selected from the group including but not limited to metals, semiconductors, semi-metals, insulators, and combinations thereof. The substantially spherical components may also consist of substantially spherical voids, which may be created by providing an array of spherical colloids embedded in a polymer matrix, followed by etching or dissolving of the spherical colloids. Such substantially spherical voids may be filled by gases, vapors, liquids, solids, or combinations thereof. In some embodiments, such substantially spherical voids may be filled with at least one component of the ionically conductive electrolyte 10 filling the gap space between the two electrically conductive electrodes 4, 6.

The photonic crystal material 18 in the indicator 2 may have a reflection wavelength that changes homogenously over the whole area of the indicator. The indicator 2 may also be configured such that particular reflection wavelengths, as well as the response of the reflected wavelength to changes in electrical property of the battery 12, may be different in different areas of the indicator 2. A homogenous change may, for instance, be seen as a uniform color change of the indicator from green, to yellow, to red as the charge capacity of the battery 12 becomes depleted. An inhomogenous change, for instance, may be seen where the indicator 12 presents a colored bar which gradually fades or changes color from one end to the other (e.g., a gradient change) much like a "fuel gauge". By "homogenous" is meant that the indicator 2 provides an indication that is substantially uniform over its entire optically detectable area. By "inhomogenous" is meant that the indicator 2 provides an indication that is different in at least two portions of its optically detectable area.

An indicator 2 displaying homogenous change may comprise a photonic crystal material 18 having homogenous electrical response and the indicator 2 may have relatively even and/or uniform construction throughout.

An indicator 2 displaying inhomogenous change may comprise a photonic crystal material 18 having inhomogenous electrical response (e.g., the photonic crystal material 18 is manufactured with inhomogenous materials at opposite ends). The indicator 2 may also have non-uniform construction. For example, the spacing between the working and counter electrodes 4, 6 may be inhomogenous (e.g., the spacer 8 may be thinner at one end than the other) with the result that the indicator 2 experiences a higher electric field at a given battery charge state. The working electrode 4 and/or the counter electrode 6 may also be provided with inhomogenous charge-storage materials having inhomogenous charge capacities, which would inhomogenously affect the response of the indicator 2 as described above. The electrodes 4, 6 may also be made using materials having different electrical properties (e.g., materials with different conductivities, different materials having different electrical work functions, etc.). The working electrode 4 and/or the counter electrode 6 may also have a certain resistivity such that the actual voltage between the electrodes 4, 6 decreases along the distance between the electrical conductors (e.g., conductive bridges 14, 16). The electrolyte 10 may also be provided in separate enclosures, such that the electrolyte 10 in one area of the indicator 2 has a different electrolyte composition from that of another area of the indicator 2. For example, separate electrolyte enclosures may be created by providing a spacer 8 that has two or more separate electrolyte-filled cavities, reservoirs or wells. These inhomogenous configurations may be used together or separately to produce an indicator 2 with an inhomogenous response.

Figure 4:
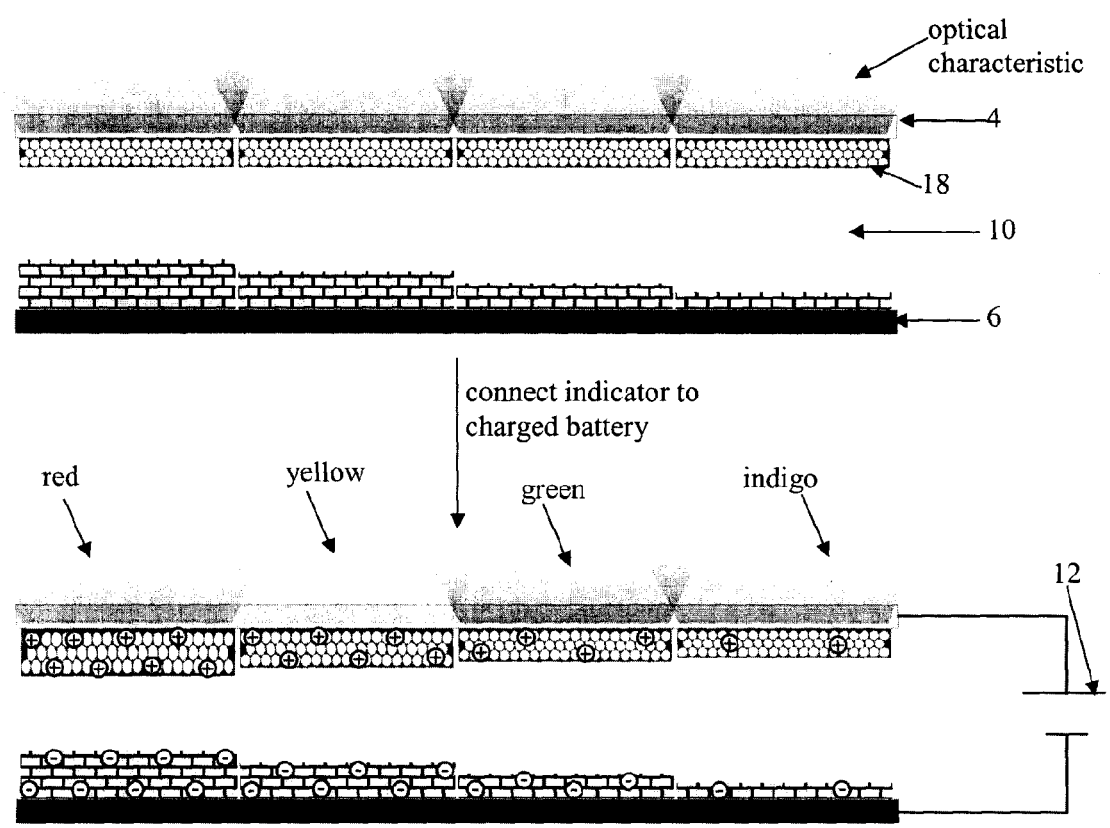
FIG. 4 is a schematic diagram showing details of an embodiment of a photonic crystal electrical property indicator having an inhomogeneous response, in accordance with an aspect of the disclosure.

Reference is now made to FIG. 4, illustrating details of the configuration of an indicator 2 having an inhomogenous response. As shown, the indicator has a counter electrode 6 that is provided with charge-storage material having different thicknesses in different portions of the indicator 2. When such an indicator 2 is connected to a battery 12, the charge in the battery the different thicknesses of the charge-storage material causes different responses in the corresponding portion of the photonic crystal material 18. In this example, the thicker portions of the charge-storage material stores a larger amount of charge than the thinner portions, causing the corresponding portion of the photonic crystal material 18 to store a larger amount of charge. This greater storage of charge in the photonic crystal material results in a greater swelling effect and hence a greater shift in the reflectance spectrum of that portion, as discussed above. As a result, different portions of the indicator 2 may exhibit different optical characteristics for a given battery charge. Variations of this configuration may provide for an indicator having a "fuel gauge" indication of state-of-charge.

Figure 5:
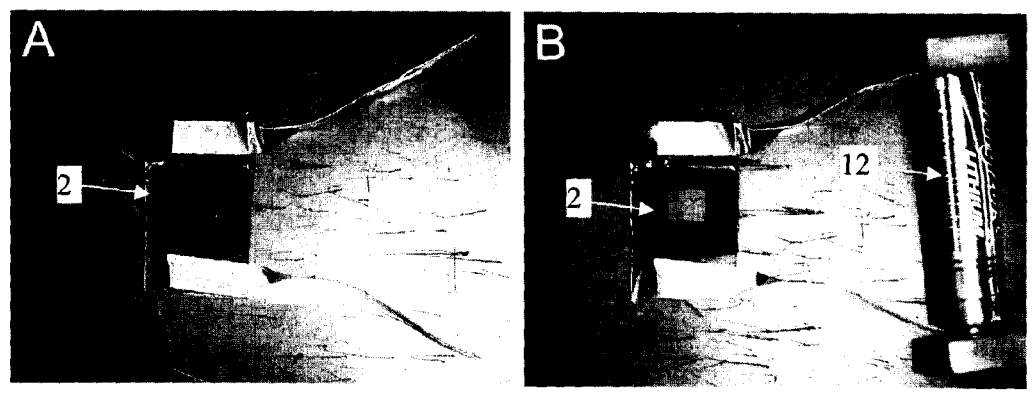
FIGS. 5A and 5B are images of an embodiment of a photonic crystal electrical property indicator, in accordance with an aspect of the disclosure, having no electrical connections, and connected to a 1.5V battery.

Reference is now made to FIGS. 5A and 5B, showing images of an embodiment of the indicator. In FIG. 2A, the indicator is unconnected and displays a reflected color of blue. In FIG. 2B, the indicator is connected to a fresh 1.5 Volt AA battery, and the indicator displays a reflected color shift to a green color.

Figure 6:
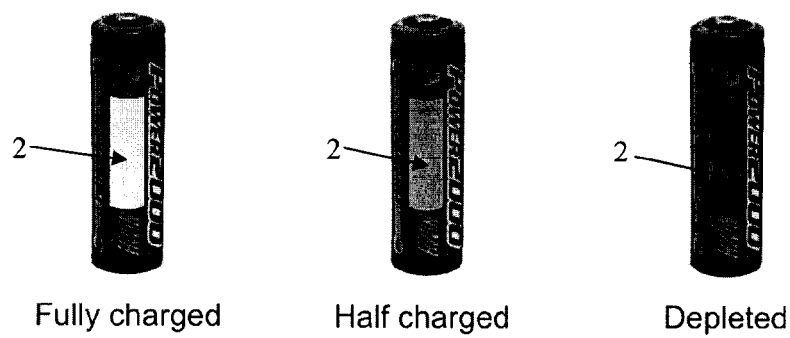
FIG. 6 illustrates an embodiment of photonic crystal electrical property indicator, in accordance with an aspect of the disclosure, affixed to a battery outer casing, showing visually detectable color changes as the battery is discharged.

Reference is now made to FIG. 6, illustrating an embodiment of the indicator 2 affixed to the outer casing of a battery 12. The indicator 2 displays visually detectable color changes as the battery 12 is discharged. When the battery 12 is fully charged, the indicator 2 shows a yellow color. When the battery 12 is half charged, the indicator 2 shows a green color. When the battery 12 is depleted, the indicator 2 shows a blue color. Although the indicator 12 is shown at specific discharge states of the battery 2, the indicator 12 is not limited to indication of these specific discharge states, but rather may display a continuum of color changes, reflecting a continuum of discharge states of the battery 12.

The indicator 2 may be flexible, or substantially flexible. For example, the components of the indicator 2 may all be manufactured using substantially flexible material. The indicator 2 may also be integrated into the label of the battery 12. In the case where the indicator 2 is to be applied to a non-planar surface of the battery 12, for example where the battery 12 is a cylindrical dry cell, the indicator 2 may be sufficiently flexible to wrap around the outside of the battery casing.

The indicator 2 may incorporate additional visual effects, such as a visible design, which may be provided, for example, within or on the electrodes 4, 6, within or on the photonic crystal material 18, within the cell gap, on the external surfaces of the indicator 2, between the indicator 2 and the battery surface (e.g., if at least a portion of the indicator is fully or partially transparent), or a combination of the above. Such visual effects may be chosen from a large variety of possible types, including but not limited to: tint, hue, shading, homogenous colors, patterns, alpha-numeric characters, graphical representations, pictures, images, data, and combinations thereof.

For example, the visual effect may be provided as a design printed on the counter electrode 6 or its substrate. The visual effect may also be provided as colored beads embedded within the photonic crystal material 18. Alternatively, the photonic crystal material 18 itself may be manufactured with portions that are not electrically-responsive, such that when the remaining electrically-responsive portions of the photonic crystal material 18 displays an optical change indicating electrical properties of the battery, a design is revealed by the non-responsive portions of the photonic crystal material 18. A visual effect may also be provided by using an electrochromic material for at least some portions of the device, such as the charge-storage material or the polymer matrix of the photonic crystal material 18. An electrochromic material is one whose visible color (for example, due to absorption of certain wavelengths) depends on an applied voltage. The electrochromic material may incorporate a design. Such a design may have different colors at different charge states, or the design may only be visible at certain charge states. In an example, where the polymer matrix of the photonic crystal material 18 incorporates an electrochromic material, the polymer material may exhibit differences in its absorbance in response to the state-of-charge of a battery. The polymer material may darken in response to a full charge of a battery, which may contribute to the optical characteristics of the photonic crystal material 18.

In some embodiments, the changing in optical characteristics of the photonic crystal may cause the additional visual effect to become more visible. In another embodiment, the changing of optical characteristics of the photonic crystal material may cause the additional visual effect to become less visible. The incorporation of such visual effects may provide a user with an increased ease of use due to an increase in quality and/or quantity of displayed information. The described visual effect may be static and unchanging, providing a passive effect. The described visual effect may also be dynamic, with its appearance changing in response to changes in optical characteristics of the tunable photonic crystal film and/or external stimuli, including electrical properties of the battery, and/or other external stimuli such as pressure, compression, temperature, electrical voltage or current. The static or dynamic visual effect may be provided by one or more of the methods described above.

In some cases, the indicator may be provided along with a reference chart or guide which could be compared to the appearance of the indicator. This visual comparison may provide the user with an increased reliability of use of the indicator.

The indicator may be suitable for use as an on-battery indicator. For example, the indicator may be included in the label of a battery, such that the indicator is constantly connected to the terminals of the battery and constantly indicates the state-of-charge of the battery. The indicator may also be suitable for use as an external battery tester that is only connected to the battery when a user wishes to test the state-of-charge of the battery. Although the indicator has been described as providing visually detectable indication of the state-of-charge of a battery, the indicator is not limited to providing visible indication, and may provide indication entirely outside the visible spectrum. For example, the indicator may provide optical indication entirely within the infrared spectrum, in which case indication of the state-of-charge of a battery may be detectable by a machine or other device rather than by a human user. The indicator may also be used to indicate other electrical properties. Although the indicator has been shown in use with alkaline batteries, the indicator may also be suitable for use with a wide range of battery types (e.g., alkaline batteries, lithium batteries, carbon-zinc batteries, nickel metal hydride batteries, nickel cadmium batteries, etc.), including single-use and rechargeable batteries, batteries having different voltage ranges (e.g., 1.5 V or 9 V batteries, or industrial batteries and battery banks with high voltages), batteries having different charge capacities (e.g., an Uninterrupted Power Supply). The indicator may also be used to indicate state-of-charge of other charge-storage or charge-generation devices that may be equivalent to batteries, such as capacitors, solar cells, fuel cells, generators, and other such devices.

A method of manufacture of a photonic crystal electrical property indicator as described above may include the steps of forming a tunable photonic crystal film onto the surface of a first electrically conductive electrode, orienting a second electrically conductive electrode with respect to the first electrically conductive electrode such that a spacer is providing a gap between both said electrodes, filling this gap with an ionically conductive electrolyte, sealing one or more area of the indicator, and connecting the two electrically conductive electrodes to opposite termini using electrical conductors. Variations on this method are possible (e.g., different order of steps, manufacture of more than one component in one step, etc.) and a person skilled in the art would understand that such variations and modifications are included within the scope of this disclosure.

Although the present disclosure describes certain embodiments and examples, these are provided for the purpose of illustration only and are not intended to be limiting. A person skilled in the art would understand that variations and modifications are possible within the scope of this disclosure.

The invention claimed is:

1. A photonic crystal electrical property indicator for a battery comprising:
   an electrically conductive working electrode and an electrically conductive counter electrode, the working and counter electrodes being spaced apart;
   an electrically-responsive photonic crystal material in contact with at least one of the working and counter electrodes;
   an ionically conductive electrolyte provided between the working and counter electrodes, the electrolyte being in electrical communication with both the working and counter electrodes and the photonic crystal material; and
   electrical conductors in electrical communication with the working and counter electrodes for connecting the indicator to terminals of the battery;
   wherein a charge-storage material is provided on at least one of the working and counter electrodes, or within the ionically conductive electrolyte, wherein the charge storage material has different thicknesses in at least two portions of the indicator,
   wherein the at least two portions have reflectance spectra that are responsive to a change in at least one electrical property of the battery, the reflectance spectra of the at least two portions differing, thereby providing at least two different optically detectable indications of the at least one electrical property of the battery.

2. The indicator of claim 1 wherein the optically detectable indications are each visibly detectable and distinguishable from each other.

3. The indicator of claim 1 wherein the at least one electrical property of the battery is a charge remaining in the battery.

4. The indicator of claim 1 whereby the photonic crystal material comprises an ordered array of first constituents having a first refractive index embedded within a polymer matrix having a second refractive index different than the first refractive index, the ordered array of first constituents having a lattice spacing giving rise to the reflectance spectrum;
   wherein the polymer matrix is expandable and contractible in response to uptake and expulsion of at least one component of the ionically conductive electrolyte, expansion and contraction of the polymer matrix giving rise to changes in the lattice spacing;
   wherein the uptake and expulsion of the at least one component of the ionically conductive electrolyte being responsive to a change in the at least one electrical property of the battery; and
   wherein the reflectance spectrum is dependent on the lattice spacing.

5. The indicator of claim 4 wherein the reflectance spectrum is in the range of: visible spectrum, ultraviolet spectrum, infrared spectrum, or combinations thereof.

6. The indicator of claim 1 wherein the indicator is flexible.

7. The indicator of claim 1 wherein the indicator comprises a visual effect that is optically detectable in combination with the reflectance spectrum of the photonic crystal material.

8. The indicator of claim 7 wherein the visual effect is selected from a group consisting of: a design, a tint, a hue, shading, homogenous colors, patterns, alpha-numeric characters, graphical representations, pictures, images, data, and combinations thereof.

9. The indicator of claim 7 wherein a change in the reflectance spectrum of the photonic crystal material causes the visual effect to become more or less visible.

10. The indicator of claim 7 wherein the visual effect is static.

11. The indicator of claim 7 wherein the visual effect is dynamic in response to at least one of a change in the reflectance spectrum of the photonic crystal material and an external stimulus.

12. The indicator of claim 1 wherein at least one of the working and counter electrodes is made from a conductive material selected from the group consisting of: conductive oxides, conductive ceramics, metals, carbons, conducting polymers, redox-active polymers, nanoparticles, and combinations thereof.

13. The indicator of claim 1 wherein at least one of the working and counter electrodes is provided on a substrate.

14. The indicator of claim 13 wherein the substrate is selected from a group consisting of fabrics, papers, metals, polymers, glasses, ceramics, semiconductors, inorganic materials, and combinations thereof.

15. The indicator of claim 1 wherein the charge-storage material is made from a material selected from the group consisting of: conductive oxides, conductive ceramics, metals, carbons, conducting polymers, redox-active polymers, nanoparticles, redox-active small molecules, and combinations thereof.

16. The indicator of claim 1 wherein the charge-storage material is porous.

17. The indicator of claim 4 wherein the polymer is chosen from the group consisting of: polyferrocenylsilanes, polythiophenes, polypyrroles, polyanilines, polyphenylene vinylenes, polyacetylenes, polyfluorenes, conducting polymers, conjugated polymers, metallopolymers, copolymers incorporating such polymer types, and combinations thereof.

18. The indicator of claim 4 wherein the polymer matrix comprises linear polymer chains.

19. The indicator of claim 4 wherein the polymer matrix comprises a cross-linked polymer network.

20. The indicator of claim 19 wherein the cross-linked polymer network has cross-linking groups selected from the group consisting of: covalent bonds, ionic bonds, polar covalent bonds, hydrogen bonds, hydrophobic interactions, coordination bonds, and combinations thereof.

21. The indicator of claim 4 wherein the polymer matrix is incorporated using a method selected from the group consisting of: melt infiltration, polymerization of a monomer or combination of monomers, polymerization of a crosslinker, solution infiltration, gas-phase infiltration, electrophoresis, sublimation, or combinations thereof.

22. The indicator of claim 4 wherein the ordered array of first constituents comprises an ordered array of spherical constituents.

23. The indicator of claim 22 wherein the spherical constituents comprise spherical voids.

24. The indicator of claim 23 wherein the substantially spherical voids are filled with at least one component of the ionically conductive electrolyte.

25. In combination, the indicator of claim 1 together with a reference chart for evaluating the at least one electrical property of the battery.

26. A method of manufacturing a photonic crystal electrical property indicator of claim 1 comprising:
providing an electrically conductive working electrode;
providing an electrically-responsive photonic crystal material in electrical communication with the working electrode;
providing an electrically conductive counter electrode spaced apart from the working electrode;
providing an ionically conductive electrolyte between the working and counter electrodes, the electrolyte being in electrical communication with the working and counter electrodes and the photonic crystal material;
sealing the electrolyte between the working and counter electrodes; and
providing electrical conductors in electrical communication with the working and counter electrodes for connecting the indicator to terminals of a battery;
wherein a charge-storage material is provided on at least one of the working and counter electrodes, or within the ionically conductive electrolyte, wherein the charge storage material has different thicknesses in at least two portions of the indicator, and
wherein the at least two portions have reflectance spectra that are responsive to a change in at least one electrical property of the battery, the reflectance spectra of the at least two portions differing, thereby providing at least two different optically detectable indications of the at least one electrical property of the battery.

27. A battery label comprising the indicator of claim 1.

28. A battery tester comprising the indicator of claim 1.

* * * * *